US009065772B2

(12) United States Patent
Bartfai-Walcott et al.

(10) Patent No.: US 9,065,772 B2
(45) Date of Patent: *Jun. 23, 2015

(54) DYNAMICALLY MODIFYING QUALITY OF SERVICE LEVELS FOR RESOURCES RUNNING IN A NETWORKED COMPUTING ENVIRONMENT

(71) Applicant: International Business Machines Corporation, Armonk, NY (US)

(72) Inventors: Katalin K. Bartfai-Walcott, El Dorado Hills, CA (US); Gregory J. Boss, Saginaw, MI (US); Christopher J. Dawson, Arlington, VA (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,520

(22) Filed: Jan. 13, 2014

(65) Prior Publication Data
US 2014/0129710 A1    May 8, 2014

Related U.S. Application Data

(63) Continuation of application No. 13/171,518, filed on Jun. 29, 2011, now Pat. No. 8,631,154.

(51) Int. Cl.
*H04L 12/24* (2006.01)
*H04L 12/851* (2013.01)

(52) U.S. Cl.
CPC ........ *H04L 41/5038* (2013.01); *H04L 41/5025* (2013.01); *H04L 47/2433* (2013.01)

(58) Field of Classification Search
CPC ................. H04L 29/06523; H04L 29/08954; H04L 41/5003–41/5025; H04L 41/5067; H04L 67/32–67/322
USPC ................. 709/223–226, 232–235, 238–240
See application file for complete search history.

(56) References Cited

U.S. PATENT DOCUMENTS 6,205,149 B1    3/2001    Lemaire et al.
6,882,642 B1 *  4/2005    Kejriwal et al. .............. 370/388
(Continued)

OTHER PUBLICATIONS

Mell et al., "The NIST Definition of Cloud Computing", National Institute of Standards and Technology, Information Technology Laboratory, Version 15, Oct. 7, 2009, 2 pages.

(Continued)

*Primary Examiner* — Brendan Higa
(74) *Attorney, Agent, or Firm* — William E. Schiesser; Keohane & D'Alessandro PLLC; Maxine L. Barasch

(57) ABSTRACT

Embodiments of the present invention provide an approach for dynamically modifying Quality of Service (QoS) levels for resources (e.g., applications, processes, services, etc.) running in a networked computing environment. Specifically, embodiments of the present invention dynamically adjust transport level networking QoS parameters based on associated service level agreements (SLA) term. In a typical embodiment, a set of service level requirements associated with a resource running in the networked computing environment will first be identified (e.g., in a computer data structure). Then, the set of service level requirements will be mapped to a set of QoS parameters associated with a transport layer of the networked computing environment. A current performance of the resource within the transport layer will then be determined. Once the current performance has been determined, it will be further determined whether the current performance meets the set of service level requirements. Based on this determination/comparison, the set of QoS parameters can be adjusted accordingly.

17 Claims, 8 Drawing Sheets

(56) References Cited

U.S. PATENT DOCUMENTS

| | | |
|---|---|---|
| 7,290,028 B2 | 10/2007 | Brabson et al. |
| 7,376,082 B2 | 5/2008 | Barzilai et al. |
| 7,505,411 B2 | 3/2009 | Cahn |
| 7,756,024 B1 | 7/2010 | Croak et al. |
| 7,936,694 B2 | 5/2011 | Choudhury |
| 7,940,756 B1 | 5/2011 | Duffy et al. |
| 8,112,450 B2 | 2/2012 | Thomas et al. |
| 8,213,433 B2 | 7/2012 | Zhang |
| 2002/0065907 A1 | 5/2002 | Cloonan et al. |
| 2002/0147828 A1 | 10/2002 | Chen et al. |
| 2002/0181462 A1 | 12/2002 | Surdila et al. |
| 2003/0208523 A1 | 11/2003 | Gopalan et al. |
| 2004/0090923 A1 | 5/2004 | Kan et al. |
| 2005/0088977 A1 | 4/2005 | Roch et al. |
| 2006/0129650 A1* | 6/2006 | Ho et al. ............... 709/207 |
| 2007/0156919 A1 | 7/2007 | Potti et al. |
| 2007/0263537 A1 | 11/2007 | Cahn |
| 2009/0010264 A1* | 1/2009 | Zhang ................ 370/395.21 |
| 2009/0207731 A1 | 8/2009 | Carlson et al. |
| 2009/0241170 A1* | 9/2009 | Kumar et al. ............... 726/3 |
| 2011/0137772 A1 | 6/2011 | Davis, III et al. |
| 2012/0042060 A1* | 2/2012 | Jackowski et al. ......... 709/224 |
| 2012/0078994 A1* | 3/2012 | Jackowski et al. ......... 709/202 |
| 2012/0218924 A1 | 8/2012 | Bhalla |

OTHER PUBLICATIONS

Fortuna, C. et al., "Dynamic Composition of Services for End-to-End Information Transport", Copyright 2009 IEEE, 14 pages.

"Brocade One Data Center Cloud-Optimized Networks", Position Paper, Copyright 2011 Brocade Communications Systems, Inc., 5 pages.

Brendan Y. Higa, USPTO Office Action, U.S. Appl. No. 13/171,518, Notification Date Mar. 1, 2013, 23 pages.

Brendan Y. Higa, USPTO Notice of Allowance and Fee(s) Due, U.S. Appl. No. 13/171,518, Date Mailed Sep. 5, 2013, 14 pages.

Maitland, J., "Keeping Control Isn't Easy", Chapter 4: Cloud-Based Infrastructure, Search-CloudComputing.com, Published Oct. 2009, 13 pages.

* cited by examiner

DYNAMICALLY MODIFYING QUALITY OF SERVICE LEVELS FOR RESOURCES RUNNING IN A NETWORKED COMPUTING ENVIRONMENT

CROSS-REFERENCE TO RELATED APPLICATIONS

The present patent document is a continuation of U.S. patent application Ser. No. 13/171,518, filed Jun. 29, 2011, entitled "DYNAMICALLY MODIFYING QUALITY OF SERVICE LEVELS FOR RESOURCES RUNNING IN A NETWORKED COMPUTING ENVIRONMENT", the disclosure of which is incorporated herein by reference.

TECHNICAL FIELD

Embodiments of the present invention generally relate to Quality of Service (QoS) levels. Specifically, embodiments of the present invention relate to dynamically modified QoS levels for resources running in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Challenges can exist in maintaining agreed upon Quality of Service (QoS) levels, especially in the transport layer of networked computing environments. For example, QoS priorities are typically established in advance based upon the type of data packet being sent (e.g., Transmission Control Protocol (TCP) versus User Datagram Protocol (UDP)), the source and/or destination of the network transmission, etc. Such approaches may not adequately compensate for shifting priorities or changes in agreement-based QoS requirements.

SUMMARY

In general, embodiments of the present invention provide an approach for dynamically modifying Quality of Service (QoS) levels for resources (e.g., applications, processes, services, etc.) running in a networked computing environment. Specifically, embodiments of the present invention dynamically adjust transport level networking QoS parameters based on associated service level agreement (SLA) terms. In a typical embodiment, a set of service level requirements associated with a resource running in the networked computing environment will first be identified (e.g., in a computer data structure). Then, the set of service level requirements will be mapped to a set of QoS parameters associated with a transport layer of the networked computing environment. A current performance of the resource within the transport layer will then be determined. Once the current performance has been determined, it will be further determined whether the current performance meets the set of service level requirements. Based on this determination/comparison, the set of QoS parameters can be adjusted accordingly.

A first aspect of the present invention provides a computer-implemented method for dynamically modifying quality of service levels for a resource running in a networked computing environment, comprising: identifying, in a computer data structure, a set of service level requirements associated with the resource; mapping the set of service level requirements to a set of quality of service parameters associated with a transport layer of the networked computing environment; determining a current performance of the resource within the transport layer; determining whether the current performance meets the set of service level requirements; and adjusting, responsive to the set of service level requirements not being met, the set of quality of service parameters.

A second aspect of the present invention provides a system for dynamically modifying quality of service levels for a resource running in a networked computing environment, comprising: a bus; a processor coupled to the bus; and a memory medium coupled to the bus, the memory medium comprising instructions to: identify, in a computer data structure, a set of service level requirements associated with the resource; map the set of service level requirements to a set of quality of service parameters associated with a transport layer of the networked computing environment; determine a current performance of the resource within the transport layer; determine whether the current performance meets the set of service level requirements; and adjust, responsive to the set of service level requirements not being met, the set of quality of service parameters.

A third aspect of the present invention provides a computer program product for dynamically modifying quality of service levels for a resource running in a networked computing environment, the computer program product comprising a computer readable storage media, and program instructions stored on the computer readable storage media, to: identify, in a computer data structure, a set of service level requirements associated with the resource; map the set of service level requirements to a set of quality of service parameters associated with a transport layer of the networked computing environment; determine a current performance of the resource within the transport layer; determine whether the current performance meets the set of service level requirements; and adjust, responsive to the set of service level requirements not being met, the set of quality of service parameters.

A fourth aspect of the present invention provides a method for deploying a computer infrastructure for dynamically modifying quality of service levels for a resource running in a networked computing environment, comprising: providing a computer infrastructure being operable to: identify, in a computer data structure, a set of service level requirements associated with the resource; map the set of service level requirements to a set of quality of service parameters associated with a transport layer of the networked computing environment; determine a current performance of the resource within the transport layer; determine whether the current performance meets the set of service level requirements; and adjust, responsive to the set of service level requirements not being met, the set of quality of service parameters.

BRIEF DESCRIPTION OF THE DRAWINGS

These and other features of this invention will be more readily understood from the following detailed description of the various aspects of the invention taken in conjunction with the accompanying drawings in which.

Figure 1:
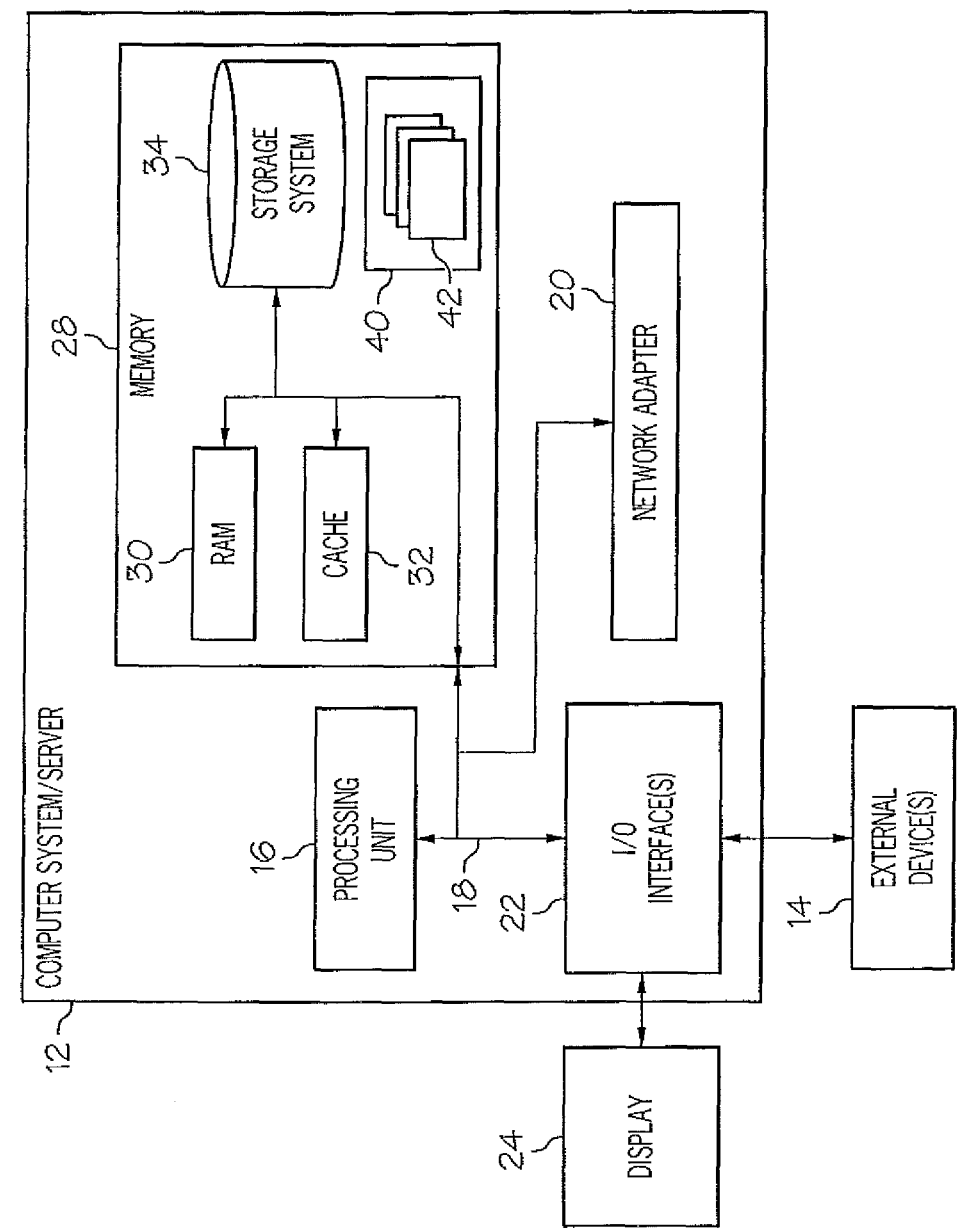
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for dynamically modifying Quality of Service (QoS) levels for resources (e.g., applications, processes, services, etc.) running in a networked computing environment. Specifically, embodiments of the present invention dynamically adjust transport level networking QoS parameters based on associated service level agreement (SLA) terms. In a typical embodiment, a set of service level requirements associated with a resource running in the networked computing environment will first be identified (e.g., in a computer data structure). Then, the set of service level requirements will be mapped to a set of QoS parameters associated with a transport layer of the networked computing environment. A current performance of the resource within the transport layer will then be determined. Once the current performance has been determined, it will be further determined whether the current performance meets the set of service level requirements. Based on this determination/comparison, the set of QoS parameters can be adjusted accordingly.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
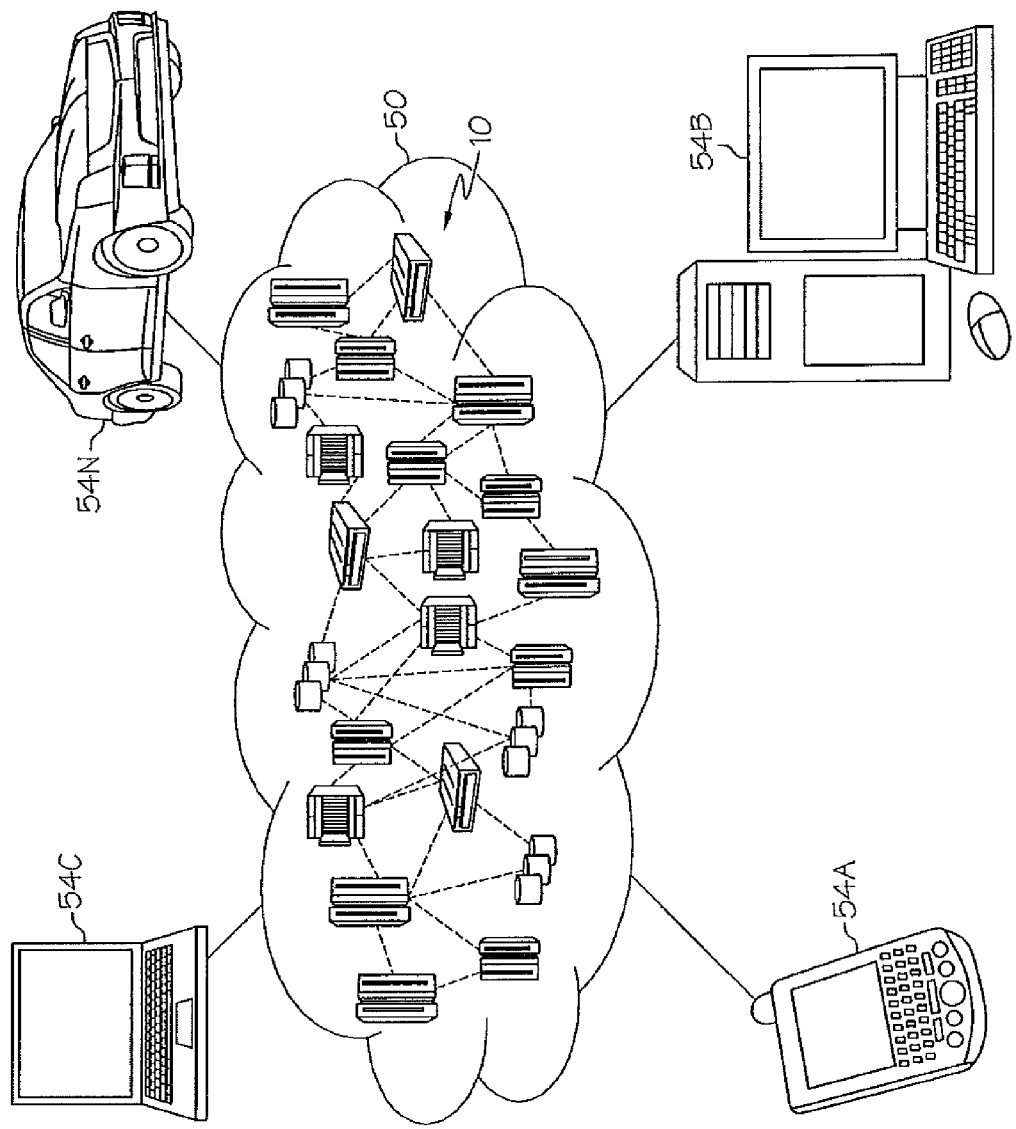
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
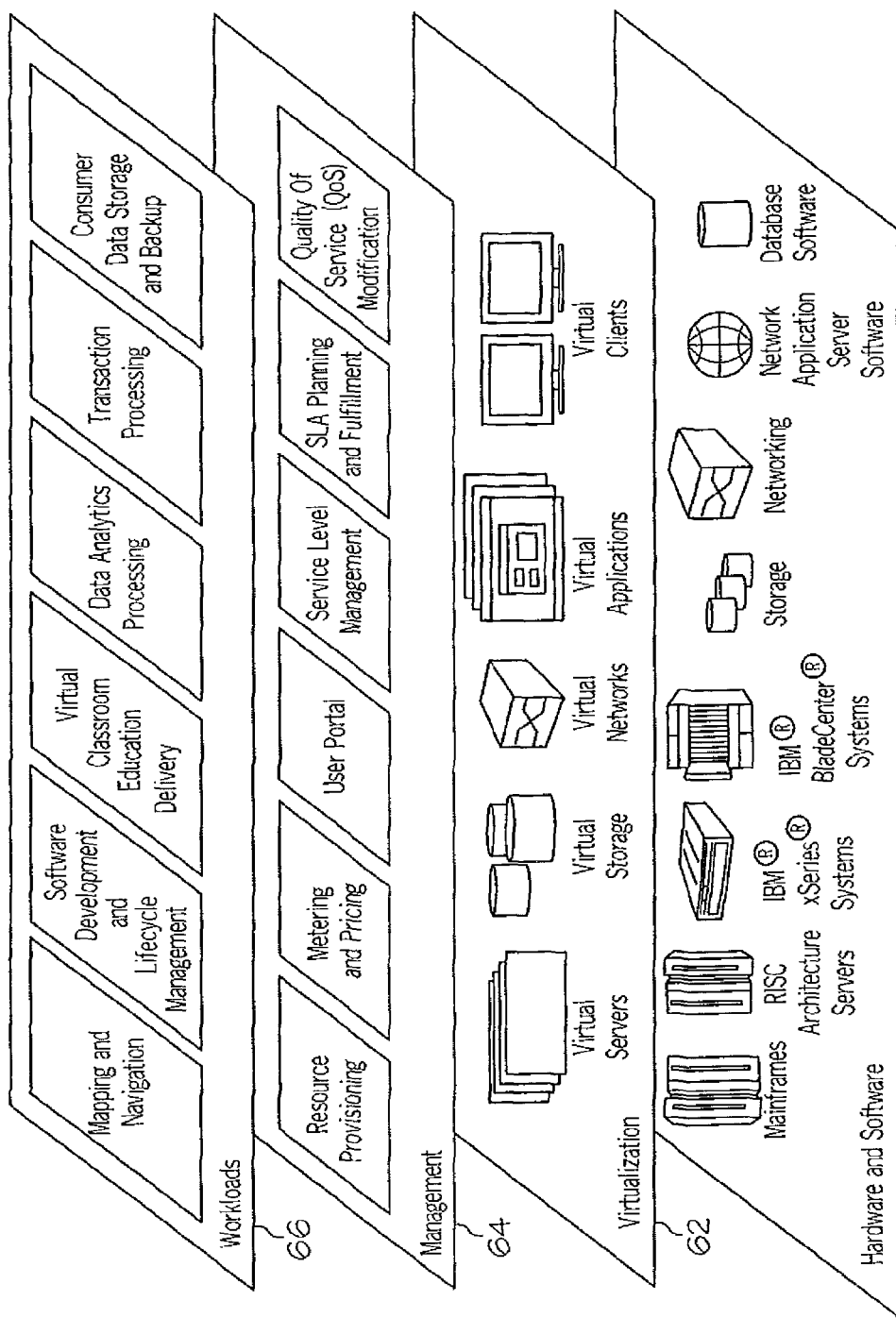
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is Quality of Service (QoS) modification, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the QoS modification functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, embodiments of the present invention provide an approach to dynamically adjust transport level networking based on the service level agreements (SLAs) defined for associated resources such as applications, processes, services, etc. This approach helps to ensure that SLAs can be met, particularly for large heterogeneous environments as may be found in cloud computing environment installations.

One aspect of the embodiments of the present invention is that priority and Quality of Service (QoS) delivered at the transport level (e.g., Transmission Control Protocol/Internet Protocol (TCP/IP)) may be dynamically calculated and modified/updated based on service levels associated with resources. For example, a mission-critical application that is being backed up may automatically change the QoS of the TCP/IP packets to ensure that the backups complete on time, or an important business process may be in jeopardy of failing if priority is not given to a network transmission on a highly utilized switch. An aspect of the present invention is that such overriding concerns are given appropriate attention.

Figure 4:
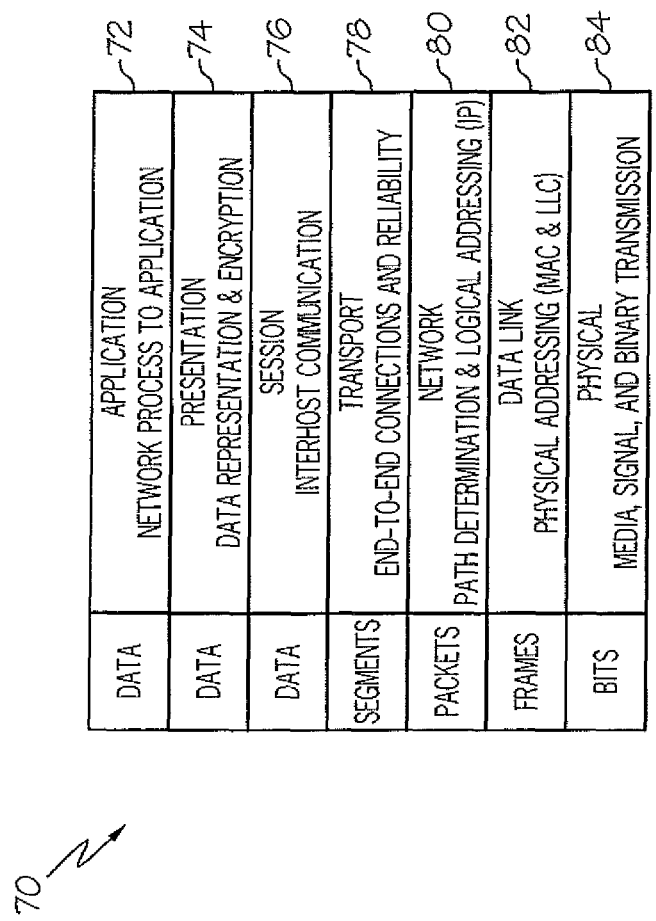
FIG. 4 depicts an Open Systems Interconnect (OSI) stack according to an embodiment of the present invention.

Referring now to FIG. 4, an illustrative Open Systems Interconnect (OSI) stack 70 according to an embodiment of the present invention is shown. As depicted, OSI stack 70 comprises the following layers:

Application layer 72: This is the layer at which communication partners are identified, QoS is identified, user authentication and privacy are considered, and any constraints on data syntax are identified. This layer is typically not the application itself, although some applications may perform application layer functions.

Presentation layer 74: This is a layer (sometimes called the syntax layer), usually part of an operating system, that converts incoming and outgoing data from one presentation format to another (e.g., from a text stream into a popup window with the newly arrived text).

Session layer 76: This layer sets up, coordinates, and terminates conversations, exchanges, and dialogs between the applications at each end. Session layer 76 is associated with session and connection coordination.

Transport layer 78: This layer manages the end-to-end control (e.g., determining whether all packets have arrived) and error-checking. Transport layer 78 works to ensure complete data transfer.

Network layer 80: This layer handles the routing of the data (e.g., sending data in the right direction to the right destination on outgoing transmissions and receiving incoming transmissions at the packet level). Network layer 80 performs routing and forwarding.

Data link layer 82: This layer provides synchronization for the physical level and does bit-stuffing for strings of 1's in excess of 5. Data link layer 82 furnishes transmission protocol knowledge and management.

Physical layer 84: This layer conveys the bit stream through the network at the electrical and mechanical level. Physical layer 84 provides the hardware means of sending and receiving data on a carrier.

In general, embodiments of the invention dynamically modify QoS parameters for running resources at transport layer 78 based on associated service level requirements (e.g., as set forth in associated SLAB).

Figure 5:
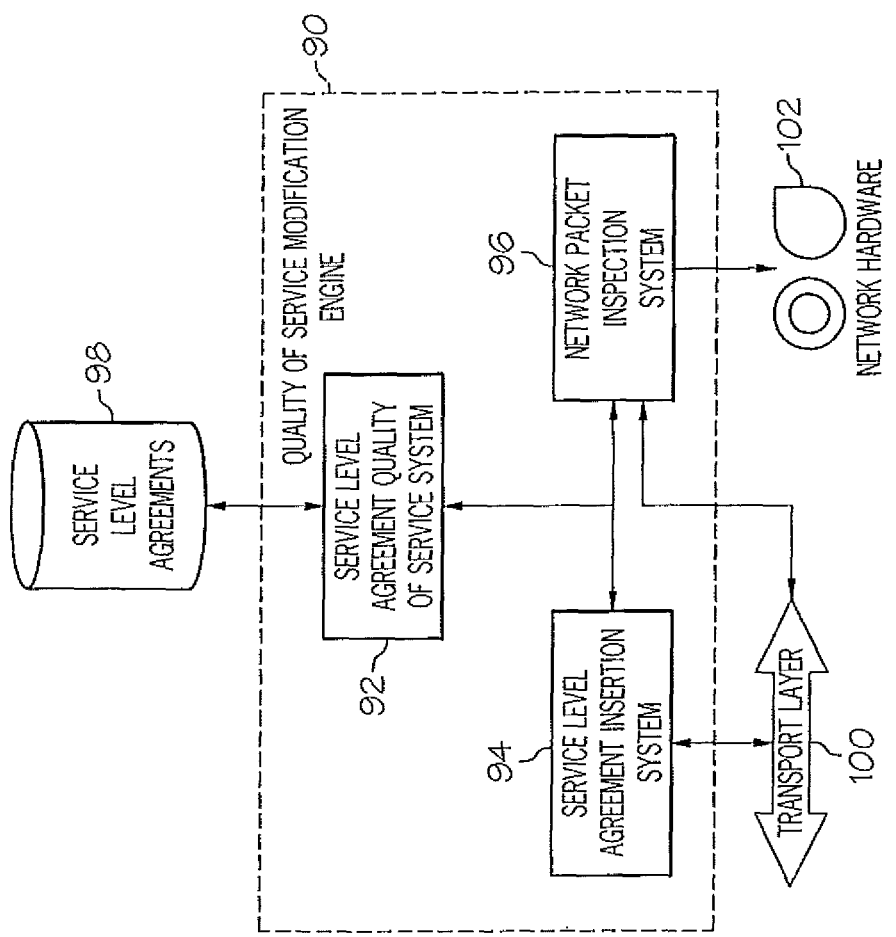
FIG. 5 depicts a system diagram according to an embodiment of the present invention.

Referring now to FIG. 5, a system diagram according to an embodiment of the present invention is shown. As depicted in FIG. 5, a QoS modification engine (engine 90) is provided. In general, engine 90 can be implemented as one or more programs such as program 40 of FIG. 1 and is capable of implementing the functionality discussed herein such as that depicted by QoS modification function of management layer 64 of FIG. 3. Moreover, engine 90 generally comprises SLA QoS system 92, SLA insertion system 94, and network packet inspection system 96. These systems generally have the following functions:

SLA QoS system 92 accesses a database 98 that stores SLA related information for the services, applications and business processes currently being executed in the networked computing environment. For example, a credit card processing service may have an SLA that states that the process should take no more than ten seconds. A batch job may have an SLA which states that the process should take no more than 4 hours. SLA QoS system 92 takes such SLAs and writes the SLAs to a database that is accessible by network package inspection system 96. Once stored, the SLA QoS system 92 continues to monitor the services and business processes, and updates the database with priorities of each based on current SLA attainment. For example, the credit card processing and batch job services may have an entry in the database similar to the following:

| Service | Unique Identifier | Transaction Identification | SLA Metric | Current Status | Flag |
|---------|-------------------|----------------------------|------------|----------------|------|
| Credit Card | 1234 | 1 | 10 seconds | 5 seconds remaining | Medium |
| Batch Job | 4321 | 2 | 4 hours | 3 hours remaining | Low |

SLA QoS system 92 continually checks processing of the service and updates the database. For example, after a period of time, the table may change to:

| Service | Unique Identifier | Transaction Identification SLA | SLA Metric | Current Status | Flag |
|---------|-------------------|-------------------------------|------------|----------------|------|
| Credit Card | 1234 | 1 | 10 seconds | 1 second remaining | High |
| Batch Job | 4321 | 2 | 4 hours | 3 hours remaining | Low |

Each column of these tables is described below:

Service: The name of the service that has SLAs associated therewith.

Unique Identifier (UID): A unique identifier used to identify the service. In this example, '1234' means the credit card service.

Transaction ID: The specific transaction being processed, because the service may be instantiated more than once.

SLA: The SLA metric associated with the transaction.

Current Status How much time is left before the SLA will fail.

Flag: Failed, Critical, High, Medium, Low. Based on the current status, this indicates the priority that should be given to the network traffic QoS at this point in time. It is noted that other embodiments could use similar grading factors, and that an implementation of this invention need not use exactly these terms.

Regardless, SLA QoS system 92 continually updates the table(s) and updates the priority flag based on current processing. In this example, the credit card service, transaction 1, will fail the service level in one second, so the flag is changed to 'high'—showing that there is a need to push the QoS of the network traffic associated with the service to be a high priority. The batch job service flag remains low due to the remaining time before SLA failure. It is further noted that, in another embodiment, the timing between polls can be modified based on the SLA. For example, the batch job may only need to be polled every 30 minutes, whereas the credit card service may need to be polled every second. Such polling frequency modification can be executed simply, using a variety of well-known methods.

SLA insertion system 94 can be implemented via software in the application which initiates network data transfers. In this invention, the system will insert a unique identifier into the transport layer 100 (also shown as transport layer 78 of FIG. 4) of each data packet being sent, so as to associate it with the service for which the network connection is being used. SLA insertion system 94 may read database 98 from the SLA QoS system 92 to find the UID of the service to embed into the packets being sent. For example, all network packets associated with the credit card service are given the UID of '1234'. It can be recognized that SLA insertion system 94 may be implemented in software, hardware (including firmware), or various combinations of associated logic.

Network packet inspection system 96 may be embedded into network hardware 92 such as key routers and/or switches 102 within the IT environment. Much as a router looks at the network layer to determine routing of TCP/IP packets, network packet inspection system 96 looks at transport layer 100 to determine whether the UID has been set. If a UID is found, and optionally if not, network packet inspection system 96 looks at the database 98 to determine whether there is a flag to determine overall priority of the network packet. If a flag is found, network packet inspection system 96 uses the flag to change the QoS of the packet to improve bandwidth or throttle other (less important) network communications.

Illustrative Implementation

Figure 6:
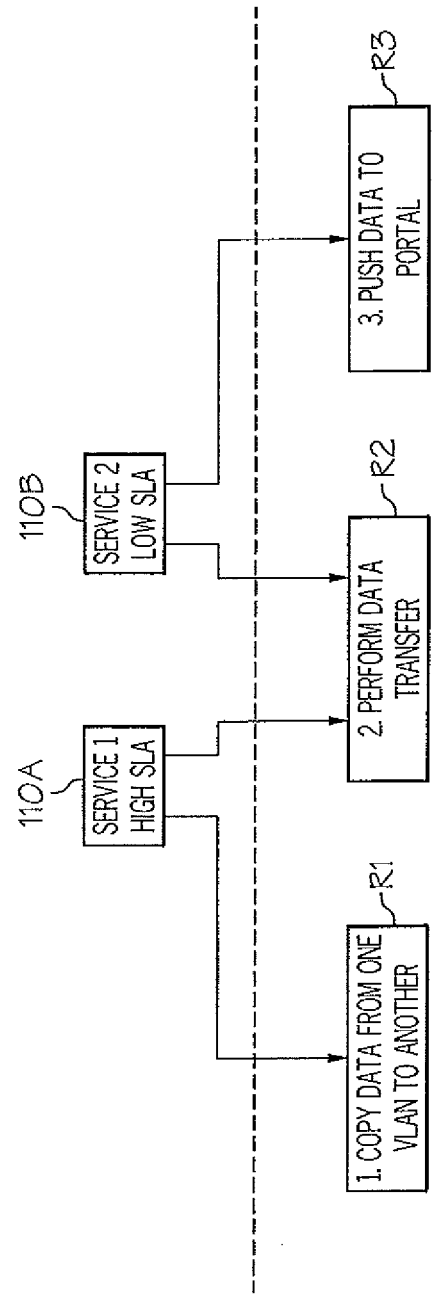
FIG. 6 depicts a service decomposition process flow diagram according to an embodiment of the present invention.

The invention is typically implemented through one or more of the three systems identified above with an associated method. FIG. 6 shows an example of two services 110A-B (also referred to herein as Service 1 and Service 2) with a breakdown of the network communications upon which both services rely. In this example, Service 1 requires two network transfers of data between Virtual Local Area Networks (VLANs) R1 and a separate data transfer R2. Service 2 requires a data push to the port R2-R3.

Referring back to FIG. 5, when a new service is rolled out, these relationships may be calculated, either manually by the software/IT designer, or by automatic means. A determination can then be made as to which packets need to have the UID inserted. Networks that are not within the control of the enterprise, for example, do not need to be analyzed by network packet inspection system 96. Once this determination is completed, such information may be fed to the SLA QoS system 92 such that it knows which data transfers affect the service. SLA QoS system 92 may optionally be updated (e.g., periodically, continuously, etc.) as to current processing status of each business process or service. This can be achieved by communication to a submission engine or job scheduler (e.g., a service request system). It may also communicate directly to the key application server that is managing each service to determine completion state. In either case, database 98 may be updated. Next, SLA insertion system 94 will be embedded into each computer that initiates a data connection (e.g., a credit card authorization system). Then, SLA insertion system 94 adds the UID to each data packet before transmission.

In a typical embodiment, network packet inspection system 96 functionality can be included in any key routers or switches along the path of possible communications bottlenecks. Such network packet inspection system 96 functionality can be integrated as a hardware appliance or included as part of the router or switch software. Network packet inspection system 96 uses database 98 to make decisions for QoS priority. It is noted that "database" as used in this description could take on a variety of forms, including databases such as IBM® DB2® (IBM, DB2, and related terms are trademarks of IBM Corp. in the United States and/or other countries), or it could take on other forms such as purely memory-resident data structures allowing for rapid recall and correlation of relevant information.

Figure 7:
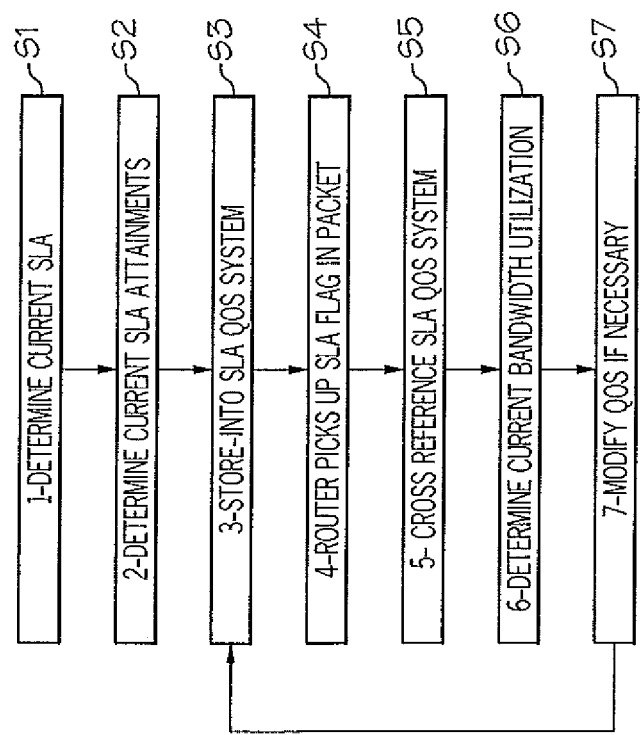
FIG. 7 depicts a method flow diagram according to an embodiment of the present invention.

Regardless, FIG. 7 depicts an illustrative method flow diagram outlining the process steps to be used in accordance with the embodiments of the present invention. It is noted that one or more of these steps could be rearranged without loss of functionality.

Step S1: "Determine current SLAs" is generally (but not necessarily) performed only once. This could be entered manually by a system administrator, or it could be captured through automated means (e.g. extracted from a table of SLAs). Furthermore, since periodic SLA changes may occur, updates can be captured through either push or pull of such information. Regardless of form, this step captures the base SLAs for each service.

Step S2: Determine current SLA attainments. The SLA QoS system communicates with the job scheduler, portal, or application running the service to determine whether the service is being executed. If the service can be executed concurrently by more than one thread, the QoS system chooses a transaction identifier and also stores the identifier in the database.

Step S3: The SLA QoS system continually updates and stores the SLA current attainment and flag information into the database.

Step S4: Assuming that all packets associated with services have the QoS field in the transport field set (by the insertion system), the network packet inspection system running on the router scans each incoming packet.

Step S5: For each packet found, the network packet inspection system checks the database to determine what the relative priority of the QoS should be for that packet and modifies the QoS accordingly.

Step S6: The network packet inspection system may look at current bandwidth utilization to determine whether throttling of non-service aligned packets is required (e.g., personal web browsing, Domain Name System (DNS) requests, email, etc.).

Step S7: Network packet inspection system modifies the QoS flag of each packet as necessary to optimize throughput of networking packets.

Through use of the techniques outlined herein, service level achievement can be strengthened and overall revenue/cost structures optimized for the adopting organization. Furthermore, this approach can benefit (among others) organizations that have large heterogeneous traffic mixes, such as are often found with providers who offer various cloud computing services.

Figure 8:
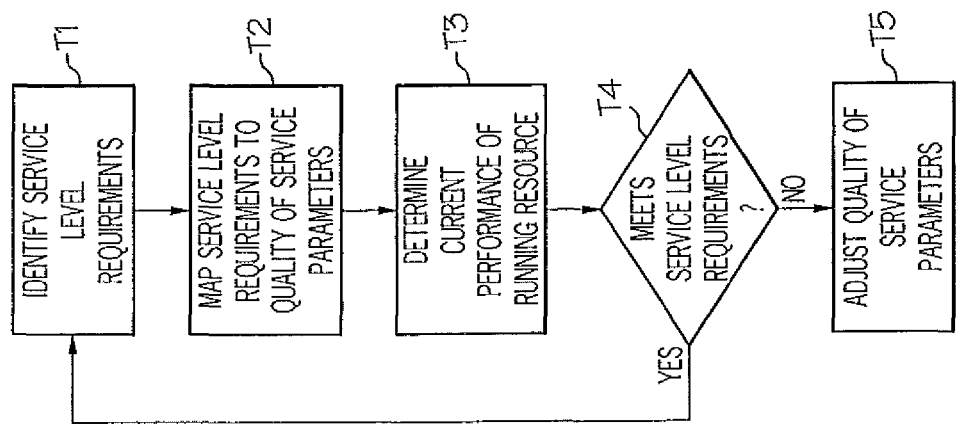
FIG. 8 depicts another method flow diagram according to an embodiment of the present invention.

Referring now to FIG. 8, another method flow diagram according to an embodiment of the present invention is shown. In step T1 is a set of service level requirements (as identified from at least one SLA) associated with a resource (e.g., an application, a process, a service, etc.) running in a networked computing environment is identified in a computer data structure. In step T2, the set of service level requirements are mapped to a set of QoS parameters associated with a transport layer of the networked computing environment. In step T3, a current performance of the resource within the transport layer is determined. In step T4, it is determined whether the current performance meets the set of service level requirements. If so, the process can be repeated for other resources running in the networked computing environment. However, responsive to the set of service level requirements not being met, the set of QoS parameters is adjusted in step T5. In general, the adjusting of the QoS parameters can include one or more of the following: assigning a higher priority level to a set of data packets being sent pursuant to the running of resource in the networked computing environment, allocating additional bandwidth to the set of data packets, and/or modifying a Quality of Service flag associated with the set of data packets.

While shown and described herein as a dynamic QoS modification solution, it is understood that the invention further provides various alternative embodiments. For example, in one embodiment, the invention provides a computer-readable/useable medium that includes computer program code to enable a computer infrastructure to provide dynamic QoS modification functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide dynamic QoS modification functionality. In this case, the service provider can create, maintain, support, etc., a computer infrastructure, such as computer system 12 (FIG. 1) that performs the processes of the invention for one or more consumers. In return, the service provider can receive payment from the consumer (s) under a subscription and/or fee agreement and/or the service provider can receive payment from the sale of advertising content to one or more third parties.

In still another embodiment, the invention provides a computer-implemented method for dynamic QoS modification. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for dynamically modifying quality of service levels for a resource running in a networked computing environment, comprising:
    determining a data packet, from a plurality of data packets, that requires insertion of a unique identifier into a transport layer of the networked computing environment, the unique identifier associating the data packet with the resource;
    adding the unique identifier into the transport layer for the determined data packet;
    checking a database to determine a level of priority for the data packet has been set;
    identifying, in a computer data structure, a set of service level requirements associated with the resource;
    mapping the set of service level requirements to a set of quality of service parameters associated with the transport layer;
    determining a current performance of the resource within the transport layer;
    determining whether the current performance meets the set of service level requirements;
    updating, responsive to a change in the service level requirements, the mapping of the set of service level requirements to the set of quality of service parameters; and
    adjusting, responsive to the set of service level requirements not being met, the set of quality of service parameters, the adjusting comprising raising the level of priority for the data packet.

2. The computer-implemented method of claim 1, the resource comprising at least one of the following: an application, a process, or a service.

3. The computer-implemented method of claim 1, the set of service level requirements being identified from at least one service level agreement associated with the resource.

4. The computer-implemented method of claim 1, further comprising inserting a unique identifier into the transport layer for each of a set of data packets, the unique identifier being sent pursuant to the running of the resource in the networked computing environment.

5. The computer-implemented method of claim 4, the adjusting comprising allocating of additional bandwidth to the set of data packets.

6. The computer-implemented method of claim 4, the adjusting comprising modifying a quality of service flag associated with the set of data packets.

7. The computer-implemented method of claim 1, wherein a service solution provider provides a computer infrastructure that performs the method for one or more consumers.

8. A system for dynamically modifying quality of service levels for a resource running in a networked computing environment, comprising:
    a bus;
    a processor coupled to the bus; and a memory medium coupled to the bus, the memory medium comprising instructions to:

determine a data packet, from a plurality of data packets, that requires insertion of a unique identifier into a transport layer of the networked computing environment, the unique identifier associating the data packet with the resource;

add the unique identifier into the transport layer for the determined data packet;

check a database to determine a level of priority for the data packet has been set;

identify, in a computer data structure, a set of service level requirements associated with the resource;

map the set of service level requirements to a set of quality of service parameters associated with the transport layer;

determine a current performance of the resource within the transport layer;

determine whether the current performance meets the set of service level requirements;

update, responsive to a change in the service level requirements, the mapping of the set of service level requirements to the set of quality of service parameters; and adjust, responsive to the set of service level requirements not being met, the set of quality of service parameters, the adjusting comprising raising the level of priority for the data packet.

9. The system of claim 8, the resource comprising at least one of the following: an application, a process, or a service.

10. The system of claim 8, the set of service level requirements being identified from at least one service level agreement associated with the resource.

11. The system of claim 8, the memory medium further comprising instructions to insert a unique identifier into the transport layer for each of a set of data packets being sent pursuant to the running of the resource in the networked computing environment.

12. The system of claim 11, the memory medium further comprising instructions to allocate additional bandwidth to the set of data packets.

13. A computer program product for dynamically modifying quality of service levels for a resource running in a networked computing environment, the computer program product comprising a computer readable storage device, and program instructions stored on the computer readable storage device, to:

determine a data packet, from a plurality of data packets, that requires insertion of a unique identifier into a transport layer of the networked computing environment, the unique identifier associating the data packet with the resource;

add the unique identifier into the transport layer for the determined data packet;

check a database to determine a level of priority for the data packet has been set;

identify, in a computer data structure, a set of service level requirements associated with the resource;

map the set of service level requirements to a set of quality of service parameters associated with the transport layer;

determine a current performance of the resource within the transport layer;

determine whether the current performance meets the set of service level requirements;

update, responsive to a change in the service level requirements, the mapping of the set of service level requirements to the set of quality of service parameters; and adjust, responsive to the set of service level requirements not being met, the set of quality of service parameters, the adjusting comprising raising the level of priority for the data packet.

14. The computer program product of claim 13, the resource comprising at least one of the following: an application, a process, or a service.

15. The computer program product of claim 13, the set of service level requirements being identified from at least one service level agreement associated with the resource.

16. The computer program product of claim 13, the computer readable storage device further comprising instructions to:

insert a unique identifier into the transport layer for each of a set of data packets being sent pursuant to the running of the resource in the networked computing environment; and modify a quality of service flag associated with the set of data packets.

17. The computer program product of claim 16, the computer readable storage device further comprising instructions to allocate additional bandwidth to the set of data packets.

* * * * *